United States Patent
Miura

(10) Patent No.: US 8,666,708 B2
(45) Date of Patent: Mar. 4, 2014

(54) PID ADJUSTMENT SUPPORT DEVICE AND METHOD

(75) Inventor: Mayumi Miura, Tokyo (JP)

(73) Assignee: Azbil Corporation, Tokyo (JP)

( * ) Notice: Subject to any disclaimer, the term of this patent is extended or adjusted under 35 U.S.C. 154(b) by 410 days.

(21) Appl. No.: 13/012,107

(22) Filed: Jan. 24, 2011

(65) Prior Publication Data

US 2011/0184707 A1    Jul. 28, 2011

(30) Foreign Application Priority Data

Jan. 28, 2010    (JP) .................................. 2010-016522

(51) Int. Cl.
*G06F 7/60* (2006.01)
*G06F 17/10* (2006.01)

(52) U.S. Cl.
USPC ............................................................ 703/2

(58) Field of Classification Search
USPC ............................................................ 703/2
See application file for complete search history.

(56) References Cited

U.S. PATENT DOCUMENTS 4,991,770 A * 2/1991 Bird et al. .................... 236/44 C
2010/0312364 A1* 12/2010 Eryilmaz et al. ................ 700/30

FOREIGN PATENT DOCUMENTS

JP    2004-38428 A    2/2004
JP    2006-127079 A    5/2006

* cited by examiner

*Primary Examiner* — Dwin M Craig

(74) *Attorney, Agent, or Firm* — Troutman Sanders LLP

(57) ABSTRACT

A PID adjustment support device has: a recognition tolerance interval storing portion for storing, in advance, a recognition tolerance interval understood by a user regarding target quantity data of a model to be controlled; and a display processing portion for graphing and displaying, on a displaying portion, the target quantity data and, as a modeling result, a model-response waveform that is a control-response waveform calculated based on the model to be controlled, and for overlaying with the modeling result and displaying the recognition tolerance interval stored in the recognition tolerance interval storing means.

12 Claims, 10 Drawing Sheets

PID ADJUSTMENT SUPPORT DEVICE AND METHOD

CROSS REFERENCE TO RELATED APPLICATIONS

The present application claims priority under 35 U.S.C. §119 to Japanese Patent Application No. 2010-016522, filed Jan. 28, 2010, which is incorporated herein by reference.

FIELD OF TECHNOLOGY

The present invention relates to a PID adjustment support device for generating a model to be controlled and adjusting control parameters, and, in particular, relates to a PID adjustment support device and method for overlaying and displaying tolerance intervals for target quantity data in relation to results of modeling that are displayed in order to compare target quantity data and a model-response waveform.

BACKGROUND OF THE INVENTION

In PID adjustment support tools for generating models to be controlled and adjusting control parameters, target quantity data that are inputted in order to generate a model (time-series data of control-response waveforms and input data such as coordinate locations of way points, which serve as targets) and control-response waveforms that are calculated based on the models that are generated (hereinafter termed the model-response waveforms) are overlaid and graphed as modeling result to display the degree of matching, and the user is prompted to evaluate the suitability of the models produced. At this time, indicators corresponding to the differences between the target quantity data and the model-response waveforms are displayed as numeric values, such as evaluation function values of the modeling. (See Japanese Unexamined Patent Application Publication 2004-038428.) Additionally, common graphic display functions, such as enlarging or reducing the scales of the graphs, are also used in order to check the quality of matching. In any event, the user checks the misalignment of the target quantity data and the model-response waveform in the graph, or checks whether or not the indicator value is small, in order to evaluate the suitability of the model.

However, even the when the target quantity data itself for the modeling includes uncertainty, as disclosed in Japanese Unexamined Patent Application Publication 2006-127079, a perfect match between the target quantity data and the model-response waveform is not always the most suitable, conventionally attempts have been made to cause the target quantity data and the model-response waveform to match as closely as possible.

As described above, when the target quantity data itself for the modeling includes uncertainty, a perfect match between the target quantity data and the model-response waveform is not necessarily the most appropriate. Nevertheless, in the method according to the prior art wherein the model-response waveform is checked, if there is a misalignment between the target quantity data and the model-response waveform, then the user will attempt to match the target quantity data and the model-response waveform, and thus there is a problem in that the user falls into unnecessary trial-and-error by performing repetitive calculations and revisions to the model the equation, or is unable to evaluate the appropriateness of the model and thus is unable to move to the control parameter adjusting operation.

The present invention was created in order to solve the problems set forth above, and the object thereof is to provide a PID adjustment support device and method that reduces the likelihood of the pursuit of excessive accuracy by making it easy for the user to recognize the tolerance interval in the target quantity data that must be considered in advance when checking the target quantity data and the model-response waveform.

SUMMARY OF THE INVENTION

The PID adjustment support device as set forth in the present invention includes: tolerance interval storing means for storing in advance the tolerance interval that is understood by the user for the target quantity data of the model to be controlled; modeling result displaying means for displaying a graph of the target quantity data and, as the modeling result, the model-response waveform that is the control-response waveform that is calculated based on the model to be controlled; and tolerance interval displaying means for displaying the tolerance interval that is stored in the tolerance interval storing means, overlaying the modeling result.

Furthermore, a PID adjustment support device according to the present invention has: modeling result displaying means for displaying a graph of the target quantity data for the model to be controlled and, as the modeling result, the model-response waveform that is the control-response waveform calculated based on the model to be controlled; tolerance interval calculation processing means for determining the tolerance interval for the target quantity data from the full scale of the target quantity data or from the full scale of the model-response waveform; and tolerance interval displaying means for displaying the tolerance interval determined by the tolerance interval calculation processing means overlaying the modeling result.

Furthermore, in a first example of a configuration of a PID adjustment support device according to the present invention, the tolerance interval includes a tolerance interval on the time axis and/or a tolerance interval on a controlled quantity axis.

Furthermore, one example of a configuration of a PID adjustment support device according to the present invention further includes time axis corrected tolerance interval processing means for correcting, in accordance with the display position of the tolerance interval, the tolerance interval for the time axis that is displayed overlaying the modeling result.

Furthermore, one example of a configuration of a PID adjustment support device according to the present invention further has controlled quantity axis corrected tolerance interval processing means for correcting, in accordance with the display position of the tolerance interval, the tolerance interval for the controlled quantity axis that is displayed overlaying the modeling result.

Additionally, in one example of a configuration of a PIT) adjustment support device according to the present invention, the time axis corrected tolerance interval processing means correct the tolerance interval for the time axis in accordance with elapsed time on the time axis from the time of the start of control to the display position of the tolerance interval for the time axis, in the target quantity data and model-response waveform. Moreover, in one example of a configuration of a PID adjustment support device according to the present invention, the control axis corrected tolerance interval processing means corrects the tolerance interval for the control axis in accordance with the controlled quantity deviation of the target quantity data or the controlled quantity deviation of the model-response waveform in the display position of the tolerance interval for the controlled quantity axis.

Additionally, in one example of a configuration of a MD adjustment support device according to the present invention, when the tolerance interval displaying means redraws in accordance with a modification, through a user instruction, of the magnification/reduction of the modeling result or of the display position of the tolerance interval, the immediately previous tolerance interval is maintained and redisplayed.

The PID adjustment support method according to the present invention includes a modeling result displaying step for displaying a graph of the target quantity data for the modeling to be controlled and, as the modeling result, the model-response waveform that is the control-response waveform calculated based on the model to be controlled; and a tolerance interval displaying step for obtaining, from tolerance interval storing means, a tolerance interval understood by the user for the target quantity data, and for displaying that tolerance interval overlaying the modeling result.

Additionally, a PID adjustment support method according to the present invention has a modeling result displaying step for displaying a graph of the target quantity data for the modeling to be controlled and, as the modeling result, the model-response waveform that is the control-response waveform calculated based on the model to be controlled; a tolerance interval calculation processing step for determining a tolerance interval for the target quantity data from a full scale of the target quantity data or from a full scale of the model-response waveform; and a tolerance interval displaying step for displaying a tolerance interval determined by the tolerance interval calculation processing step, overlaying the modeling result.

Given the present invention, a tolerance interval that is stored in the tolerance interval storing means is displayed overlaying the modeling result, to enable the user to recognize, using a consistent perception, the misalignment between the target quantity data and the model-response waveform, even when the misalignment between the target quantity data and the model-response waveform is emphasized through, for example, an operation that enlarges the graph, thereby making it possible to reduce the trial-and-error by the user in order to increase excessively the accuracy of matching between the target quantity data and the model-response waveform.

Furthermore, in the present invention the tolerance interval of the target quantity data is determined from a full scale of the target quantity data or from a full scale of the model-response waveform and this tolerance interval is displayed overlaying the modeling result, thereby making it possible to reduce the trial-and-error by the user in order to increase excessively the accuracy of matching between the target quantity data and the model-response waveform. Additionally, because it is not necessary for the user to specify the tolerance interval in the present invention, the present invention can be applied also to cases wherein it is difficult to specify the tolerance interval.

Additionally, in the present invention the trial-and-error by the user in order to improve excessively the accuracy of matching of the target quantity data and the model-response waveform in the time axis direction can be reduced through correcting the tolerance interval of the time axis, displayed overlaying the modeling result, in accordance with the display position of the tolerance interval.

Additionally, in the present invention the trial-and-error by the user in order to improve excessively the accuracy of matching of the target quantity data and the model-response waveform in the controlled quantity axis direction can be reduced through correcting the tolerance interval of the controlled quantity axis, displayed overlaying the modeling result, in accordance with the display position of the tolerance interval.

DETAILED DESCRIPTION OF THE INVENTION

Figure 1:
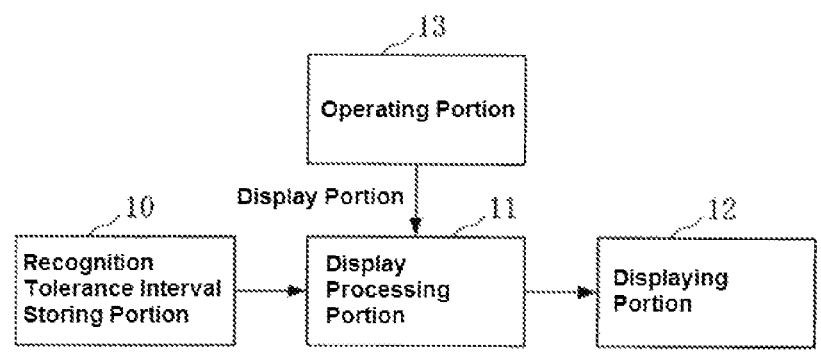
FIG. 1 is a block diagram illustrating a configuration of a ND adjustment support device according to an example of the present invention.

Because modeling functions to be controlled that are used in, for example, PID parameter adjustment support tools, assume various subjects of control and control operations (control response waveforms), when quantifying the degree of match between a subject of control and a model, the meanings of the numeric values that are quantified will vary depending on the temporal length and magnitude of response of the control-response waveform and the model-response waveform. Moreover, the meaning of the misalignment between the target quantity data and the model-response waveform will also vary depending on the degree of accuracy understood by the user when inputting the target quantity data.

When the entire response waveform is displayed in an essentially normalized state, then the misalignment when the target quantity data and the model-response waveform are overlaid and displayed can be understood with a consistent perception. However, when the target quantity data and the model-response waveform are enlarged and displayed in order to check the misalignment accurately, then it is difficult to recognize whether the misalignment is relatively larger or smaller. Even if at this time a frame having, for example, a size of 1 second on the time axis and a size of ° C. on a temperature axis were displayed along with the graph of the target quantity data and the model-response waveform, the frame would not be useful if the meanings of the numeric values were to change, as described above.

Given this, the present inventor has focused on how it is more effective to provide an index that is based on "understanding" than it is to provide an index based on a mathematical significance. Given this, the inventors arrived at the concept of eliminating the incorrect understanding by the user himself, even when a graph is magnified, by displaying a frame based on a recognition tolerance interval, specified by the user, at the same time as the graph of the target quantity data and the model-response waveform, by introducing a recognition tolerance interval that indicates the degree of accuracy recognized by the user himself when inputting the target quantity data. Moreover, the inventor arrived at the concept that it is possible to assure always a constant tolerance interval corresponding to the entire model-response waveform, even when the graph is enlarged by the user, through the introduction of an response reference tolerance interval that is based on the entire image of the response waveform in a case wherein it is difficult for the user to specify the recognition tolerance interval.

In this way, an input data tolerance interval based on "understanding" (a recognition tolerance interval or an response reference tolerance interval) is introduced and a region or quantitative value corresponding to that tolerance interval is displayed, enabling the user to understand the misalignment between the target quantity data and the model response waveform with a consistent perception, without preserving the display scale of the graph, thus making it possible to reduce the likelihood of an interruption in the adjustment work due to extraneous trial-and-error in the modeling operations or due to the difficulty in evaluating suitability.

An example will be explained in reference to the drawings. FIG. 1 is a block diagram illustrating a configuration for a PID adjustment support device according to the present invention. The PID adjustment support device includes: a recognition tolerance interval storing portion 10 for storing, in advance, a recognition tolerance interval inputted by the user; a display processing portion 111 for displaying, on to a displaying portion 12, described below, target quantity data inputted from in modeling device to be controlled externally (not shown) and a model-response waveform, and for determining, and displaying on the displaying portion 12, the display position and shape of a frame based on the recognition tolerance interval that is stored in the recognition tolerance interval storing portion 10 and a display position specified by the user; a displaying portion 12 such as a liquid crystal display; and an operating portion 13, such as a keyboard and/or a mouse. The display processing portion 11 and the displaying portion 12 structure the modeling result displaying means and the tolerance interval displaying means.

In the present example, the user specifies the recognition tolerance interval, and a frame or a numeric value is displayed on the modeling result screen based on that recognition tolerance interval. Even when the user manipulates the graph, such as enlarging or reducing the graph, the recognition tolerance interval from before the operations will be maintained and displayed. Here the recognition tolerance interval refers to a rough tolerance interval for data perceived by the user himself regarding the target quantity data, such as the measurement tolerance or the number of digits when reading data in the present example, it is possible to recognize the misalignment between the target quantity data and the model-response waveform with a consistent perception, independent of graph operations such as enlarging/reducing, through displaying the recognition tolerance interval.

Figure 2:
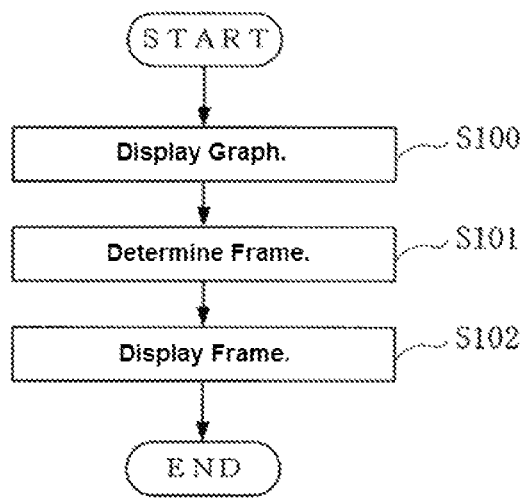
FIG. 2 is a flowchart illustrating the operation of the PID adjustment support device according to the example.
Figure 3:
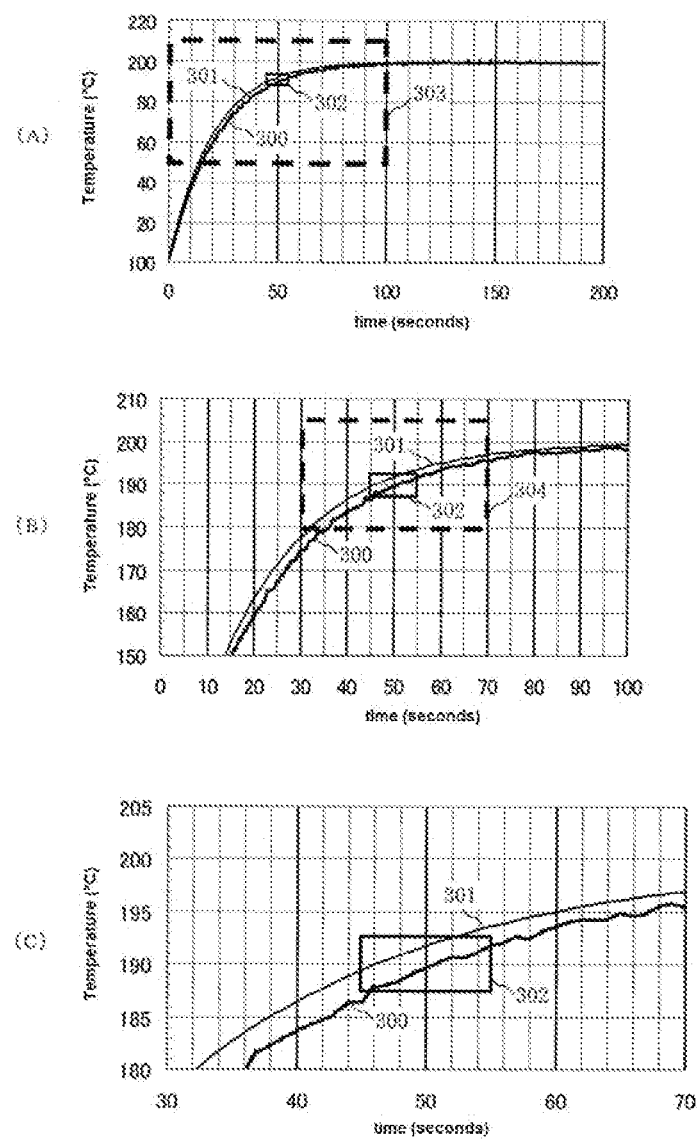
FIG. 3 is a diagram illustrating an example display of the PID adjustment support device according to the example of the present invention.

The operation of the PID adjustment support device according to the present example will be explained in detail next, FIG. 2 is a flowchart illustrating the operation of the PID adjustment support device according to the present example, and FIG. 3 (A) through FIG. 3 (C) are diagrams illustrating examples of displays in the present example. FIG. 3 (A) is a diagram illustrating a modeling result initial screen; FIG. 3 (B) is a diagram illustrating a modeling result screen wherein the screen in FIG. 3 (A) has been enlarged; and FIG. 3 (C) is a diagram illustrating a modeling result screen wherein the screen in FIG. 3 (B) has been enlarged. In FIG. 3 (A) through FIG. 3 (C): 300 is target quantity data, 301 is a model-response waveform, and 302 is a frame. Note that FIG. 3 (B) displays the region indicated by the dotted line 303 in FIG. 3 (A), and FIG. 3 (C) displays the region indicated by the dotted line 304 in FIG. 3 (B).

The PID adjustment support device receives, from a modeling device to be controlled, which generates the model to be controlled and which calculates a model-response waveform based on the model that has been generated, target quantity data that comprise time-series data of the targeted control-response waveform, and model-response waveform data. Because the technology for generating the model that is to be controlled is a well-known technology, explanations regarding the details of the modeling device to be controlled are omitted.

The display processing portion 11 of the PID adjustment support device displays, on a displaying portion 12, the target quantity data 300 and the model-response waveform 301, as illustrated in FIG. 3 (A) (Step S100 in FIG. 2). Then the display processing portion 11 determines a rectangular frame of the size of the recognition tolerance interval for the vertical axis (the controlled quantity axis) and the recognition tolerance interval of the horizontal axis (the time axis), which are stored in the recognition tolerance interval storing portion 10, centered on the coordinates of a specific display position (Step S101), to display a frame 302 on the displaying portion 12 as illustrated in FIG. 3 (A) (Step S102). The modeling result initial screen as illustrated in FIG. 3 (A) is displayed in this way. Note that the coordinates of the display position of the modeling result initial screen may be predetermined values, and the frame 302 may be displayed thereafter centered on coordinates of a display position specified by the user through a mouse click, or the like.

While the processes in FIG. 2 are also performed when the user enlarges or reduces the modeling result screen through operating the operating portion 13, the recognition tolerance interval is maintained and displayed at this time. For example, while in the modeling result initial screen in FIG. 3 (A) the size of the frame 302 is determined with, for example, the recognition tolerance interval on the controlled quantity axis being 5° C. and the recognition tolerance interval on the time axis being 10 seconds, in the modeling result screen in FIG. 3 (B), wherein the modeling result initial screen has been enlarged, the recognition tolerance interval for the controlled quantity axis, indicated by the frame 302, is still 5° C., and the recognition tolerance interval of the time axis is still 10 seconds. Similarly, the recognition tolerance intervals indicated by the frame 302 are also maintained even in the modeling result screen of FIG. 3 (C) wherein the modeling result screen of FIG. 3 (B) has been enlarged.

As described above, displaying a frame based on the recognition tolerance interval at the same time as the graphs of the target quantity data and the model-response waveform in the present example makes it possible for the user to recognize, with a consistent perception, the misalignment between the target quantity data and the model-response waveform, even when the misalignment between the target quantity data and the model-response waveform is emphasized through, for example, an operation to enlarge the graph, thus making it possible to reduce the trial-and-error by the user (for example, recalculating the model) in order to increase excessively the accuracy of matching between the target quantity data and the model-response waveform.

Note that while in the present example the shape of the frame is rectangular, there is no limitation thereto, and it may be instead, for example, elliptical. Moreover, the recognition tolerance interval may be put into quantitative values or a table and displayed in the modeling result screen, and the area display and the numeric value display may be performed simultaneously. In any of these cases, the user should be able to understand easily the specified recognition tolerance interval during the operation of reviewing the modeling result.

Additionally, while in the present example the recognition tolerance interval was specified for both the time axis and the controlled quantity axis (which was a temperature axis in the examples in FIG. 3 (A) through FIG. 3 (C)), instead the recognition tolerance interval may be specified for either one or the other. If the recognition tolerance interval is specified for only the time axis or the controlled quantity axis, then the recognition tolerance interval may be expressed with the width of a straight line, or expressed as a numeric value.

Figure 4:
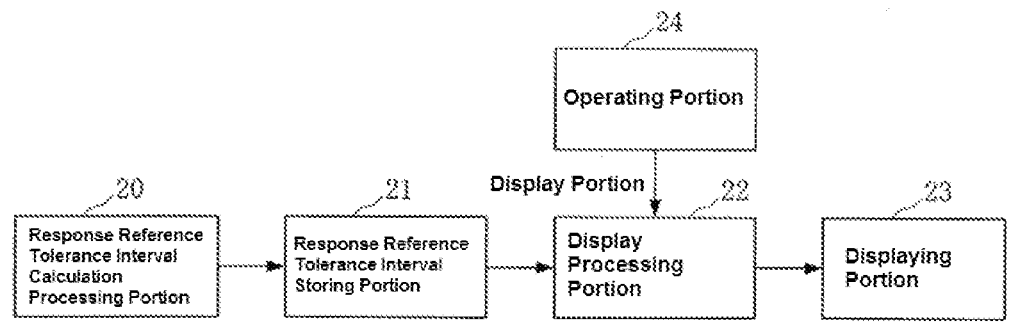
FIG. 4 is a block diagram illustrating a configuration of a PID adjustment support device according to another example according to the present invention.

Another example is explained next. FIG. 4 is a block diagram illustrating the structure of a PID adjustment support device according to the present invention. The PID adjustment support device includes: a response reference tolerance interval calculation processing portion 20 for determining a response reference tolerance interval based on a full scale of the model-response waveform, or the like; a response reference tolerance interval storing portion 21 for storing the response reference tolerance interval; a display processing portion 22 for determining, and displaying on a displaying portion 23, the display position and shape of a frame, based on the response reference tolerance interval stored in the response reference tolerance interval storing portion 21 and on a display position specified by the user; a displaying portion 23 that is a liquid crystal display, or the like; and an operating portion 24 such as a keyboard and/or a mouse. The display processing portion 22 and the displaying portion 23 structure the modeling result displaying means and the tolerance interval displaying means.

In the present example, the response reference tolerance interval is determined by the response reference tolerance interval calculation processing portion 20 instead of by the user, and a frame or a numeric value that is based on the response reference tolerance interval is displayed on the modeling result screen. Even when the user manipulates the graph, such as enlarging or reducing the graph, the response reference tolerance interval from before the operations are maintained and displayed. Here the response reference tolerance interval is an interval that is set in relation to the full scale of each axis of the target quantity data or the model-response waveform, and, specifically, indicates an interval that is easily recognized by the user, such as 1/10 or 1/1000 of the full scale. In the present example, it is possible to recognize the misalignment between the target quantity data and the model-response waveform with a consistent perception, independent of graph operations such as enlarging/reducing, through displaying the response reference tolerance interval.

Figure 5:
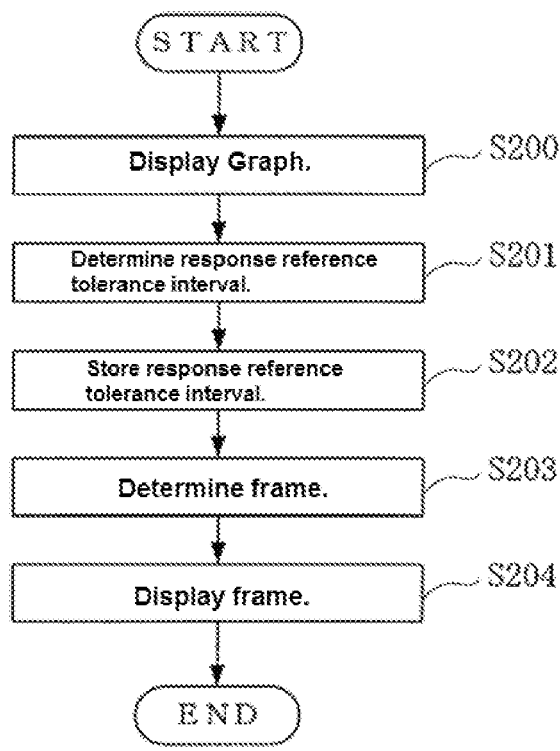
FIG. 5 is a flowchart illustrating the operation of the PID adjustment support device according to the example above.

The operation of the PID adjustment support device is explained next. FIG. 5 is a flowchart illustrating the operation of a PID adjustment support device according to the present example. As above, the display processing portion 22 of the PID adjustment support device displays the target quantity data and the model-response waveform on the displaying portion 23 (Step S200 in FIG. 5). Following this, the response reference tolerance interval calculation processing portion 20 determines the response reference tolerance interval (Step S201).

Figure 6:
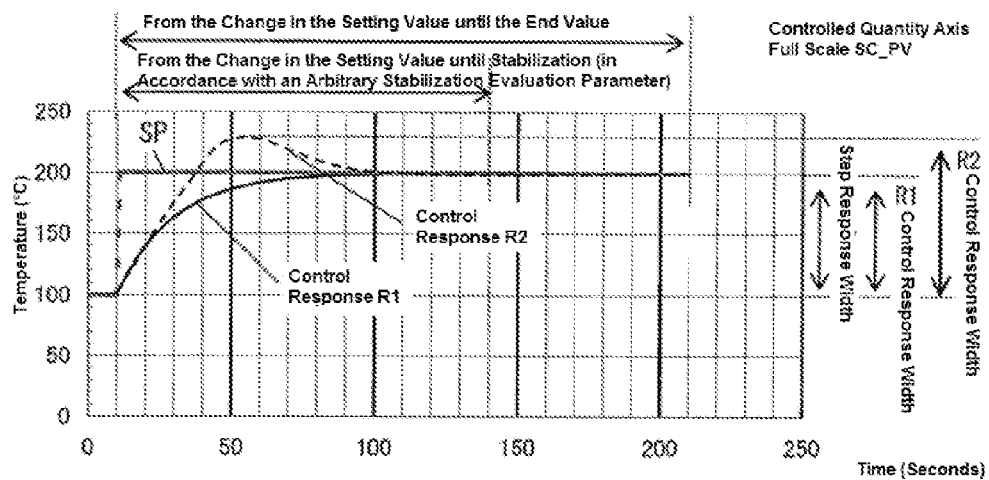
FIG. 6 is a diagram illustrating the full scale that is used by a response reference tolerance interval calculation processing portion in determining a response reference tolerance interval in the example according to the present invention.

FIG. 6 is a diagram for explaining the full scale that is used in the response reference tolerance interval calculation processing portion 20 in determining the response reference tolerance interval. The full scale that is used by the response reference tolerance interval calculation processing portion 20 should be a range in each of the axes used as a guideline when the user reviews the overall image of the modeling result screen. For example, for a control quantity axis, the step response width from the initial value of the control quantity to the control quantity setting value SP may be used as the full range for the control quantity axis, or the control response width from the minimum value to the maximum value of the control quantity may be used as the full scale of the control quantity axis. In the example in FIG. 6, the initial value of the control quantity is 100° C., and the control quantity setting value SP changes, at the point in time of the time mark at 10 seconds, from 100° C. to 200° C., so the step response width is 100° C., in the case of the control response R1, the minimum value of the control quantity (the temperature) is 100° C., and the maximum value is 200° C. Furthermore, in the case of the control response R2, the minimum value of the control quantity (the temperature) is 100° C., and the maximum value is 230° C., so the control response width is 130° C.

On the other hand, for the time axis, the time width from the time of the adjustment in the setting value until the time of stabilization may be used as the full scale for the time axis, or the time width from the change in the setting value until the final data may be used as the full scale for the time axis. In the example in FIG. 6, the controlled quantity set value SP was modified at the time mark at 10 seconds, and at 140 seconds the change has stabilized, and thus the time width between the change in the setting value until the stabilization is 130 seconds. Furthermore, because the final data is data at the time mark of 210 seconds, the time width from the time of the change in the setting value until the final data is 200 seconds.

The full scale may be set using a user-inputted characteristic quantity (an overshoot magnitude, a stabilization time, or the like), or time-series data, or the like, for the target quantity data, or may be determined using the model-response waveform data. When the full scale is determined using the target quantity data in this way, the step response width may be used as the full scale data for the controlled quantity axis, the control-response axis in the control-response waveform that is the target may be used as the full scale for the controlled quantity axis, the time width from the time of a change in a setting value until the stabilization of the control-response waveform may be used as the full scale for the time axis, and/or the time width from the time of a change in the setting value until the final data may be used as the full scale for the time axis.

Additionally, when the model-response waveform data is used to determine the full scale, then the control-response width in the model-response waveform may be used as the full scale of the controlled quantity axis, the time width from the time of a change in the setting value until the time of stabilization of the model-response waveform may be used as the full scale of the time axis, and/or the time width from the time of the change in the setting value until the final data may be used as the full scale for the time axis.

In both the case wherein the target quantity data is used to establish the full scale and the case wherein the model-response waveform data is used to establish the full scale, preferably the user is able to check whether it was the target quantity data or the model-response waveform that was used as the basis for calculating the full scale for each of the axes.

The response reference tolerance interval calculation processing portion 20, after determining the full scales for each of the axes, determines, as the response reference tolerance interval, a value wherein the full scale is multiplied by a factor that is easily understood by the user, such as 1/100 or 1/1000 (Step S201).

For example, if the full scale for the time axis is defined as SC_T and the full scale for the controlled quantity axis is defined as SC_PV, then the response reference tolerance interval calculation processing portion 20 would calculate the response reference tolerance interval TEW_SC for the time axis and the response reference tolerance interval PVEW_SC for the controlled quantity axis as follows:

$$TEW\_SC = SC\_T \times K\_T \quad (1)$$

$$PVEW\_SC = SC\_PV \times K\_PV \quad (2)$$

Here K_T is the time axis tolerance calculating coefficient and K_PV is the controlled quantity axis tolerance calculating coefficient. A coefficient that is easily understood by the user, such as 1/100 or 1/1000, should be set as appropriate, as described above, for the time axis tolerance calculating coefficient K_T and for the controlled quantity axis tolerance calculate coefficient K_PV. At this time, the setting may use the values or the number of digits of SC_T and SC_PV.

When, as described above, the time mark for the control-response stabilization time is defined as Tstbl, the time mark for the time of the start of control is defined as Tini, and the maximum value on the time axis in the modeling result is defined as $T_{max}$, then the full scale SC_T for the time axis may be defined as (Tstbl-Tini) or defined as (Tmax-Tini). Moreover, when the controlled quantity setting value is defined as SP, the controlled quantity at the start of control is defined as PVini, and the maximum value for the control that quantity is defined as PVmax, then the full scale SC_PV of the controlled quantity axis may be defined as (SP-PVini), or may be defined as (PVmax-PVini).

The response reference tolerance interval storing portion 21 stores the response tolerance intervals determined by the response reference tolerance interval calculation processing portion 20 (Step S202).

The display processing portion 22 uses the coordinate of a specific display position as the center, and establishes a rectangular frame of the sizes of the response reference tolerance interval of the controlled quantity axis and the response reference tolerance interval of the time axis, which are stored in the response reference tolerance interval storing portion 21 (Step S203), and displays the frame on the displaying portion 23 (Step S203).

As with the above example, the coordinate of the display position of the modeling result initial screen may be defined as specific values, and thereafter the frame may be displayed centered on coordinates of display positions that are specified by the user through, for example, mouse clicks.

Moreover, about the process in FIG. 5 is performed also when the user operates the operating portion 24 to enlarge or reduce the size of the modeling result screen, at such time the display processing portion 22 maintains and displays the response reference tolerance interval in the same manner as above.

The same effects as in the example above can be obtained through displaying a frame, based on the response reference tolerance intervals, simultaneously with the graph of the target quantity data and the model-response waveform in the present example, as described above. Furthermore, because there is no need for the user to specify the recognition tolerance interval, this can be applied also to cases where it is difficult to specify the recognition tolerance interval.

As with the previous example, the shape of the frame need not necessarily be a rectangle. Moreover, the response reference tolerance interval may also be displayed as numeric values or a table in the modeling result screen, and both the area display and the numeric value display may be performed simultaneously.

Moreover, while in the present example response reference tolerance intervals were established for both the time axis and the controlled quantity axis, instead a response reference tolerance interval may be established for one or the other alone. When the response reference tolerance interval is set for only the time axis or the controlled quantity axis, the response reference tolerance interval may be displayed by the width of a straight line, or may be displayed as a numeric value.

Figure 7:
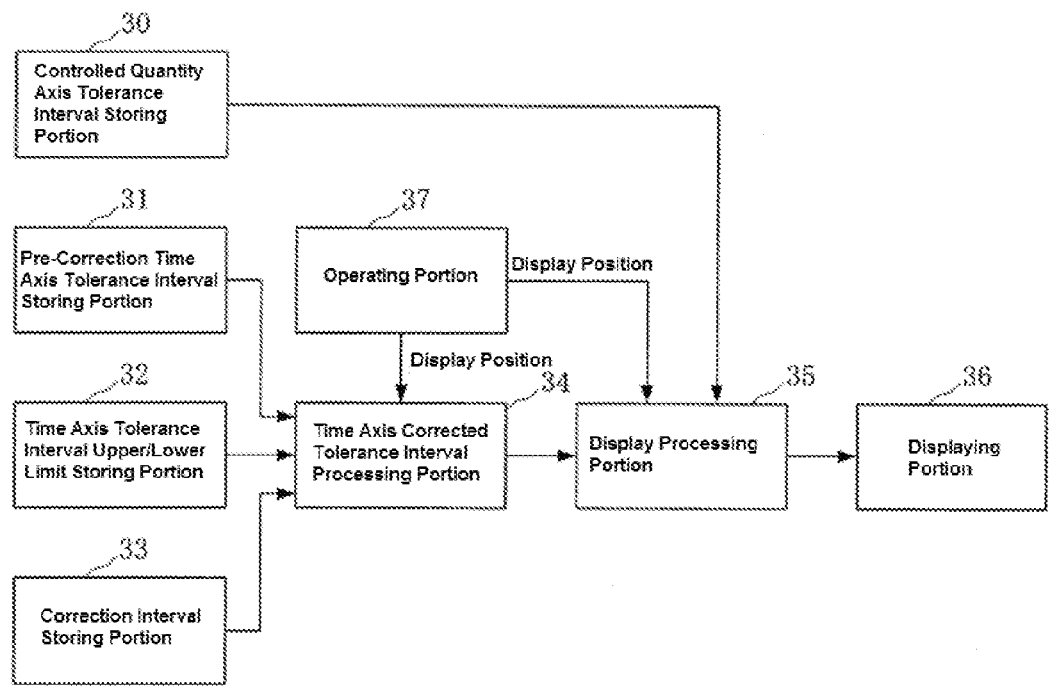
FIG. 7 is a block diagram illustrating a configuration of a PID adjustment support device according to a further example according to the present invention.

A further example is explained next. FIG. 7 is a block diagram illustrating a configuration for a PID adjustment support device according to a further example according to the present invention. The PID adjustment support device has: a controlled quantity axis tolerance interval storing portion 30 for storing a tolerance interval for a controlled quantity axis; a pre-correction time axis tolerance interval storing portion 31 for storing a time axis tolerance interval prior to a correction; a time axis tolerance interval upper/lower limit storing portion 32 for storing a maximum value and a minimum value for the time axis tolerance interval; a correction interval storing portion 33 for storing a correction interval for performing a correction on the time axis tolerance interval; a time axis corrected tolerance interval processing portion 34 for determining a time axis corrected tolerance interval wherein the time axis tolerance interval is corrected based on the pre-correction time axis tolerance interval, the maximum value and minimum value for the time axis tolerance interval, the correction interval for the tolerance interval, and the display position; a display processing portion 35 for displaying target quantity data and a model-response waveform on a displaying portion 36, described below, and for determining, and displaying on the displaying portion 36, a display position and a shape for a frame based on the tolerance intervals and on a display position specified by a user; a displaying portion 36 such as a liquid crystal display; and an operating portion 37, such as a keyboard and/or a mouse.

In the present example, a correction is applied to the tolerance interval (the recognition tolerance interval or the response reference tolerance interval) of the time axis. The likelihood of attempts at excessive accuracy can be reduced by correcting the time axis tolerance interval by reflecting the trends in changes in the tolerance interval of the time axis depending on the state of control. Given this, in the present example, the elapsed time on the time axis from the time of the commencement of control (that is, the time at which there was a change in the setting value for the controlled quantity) until the displayed position is used in the calculation of the corrected value.

Figure 8:
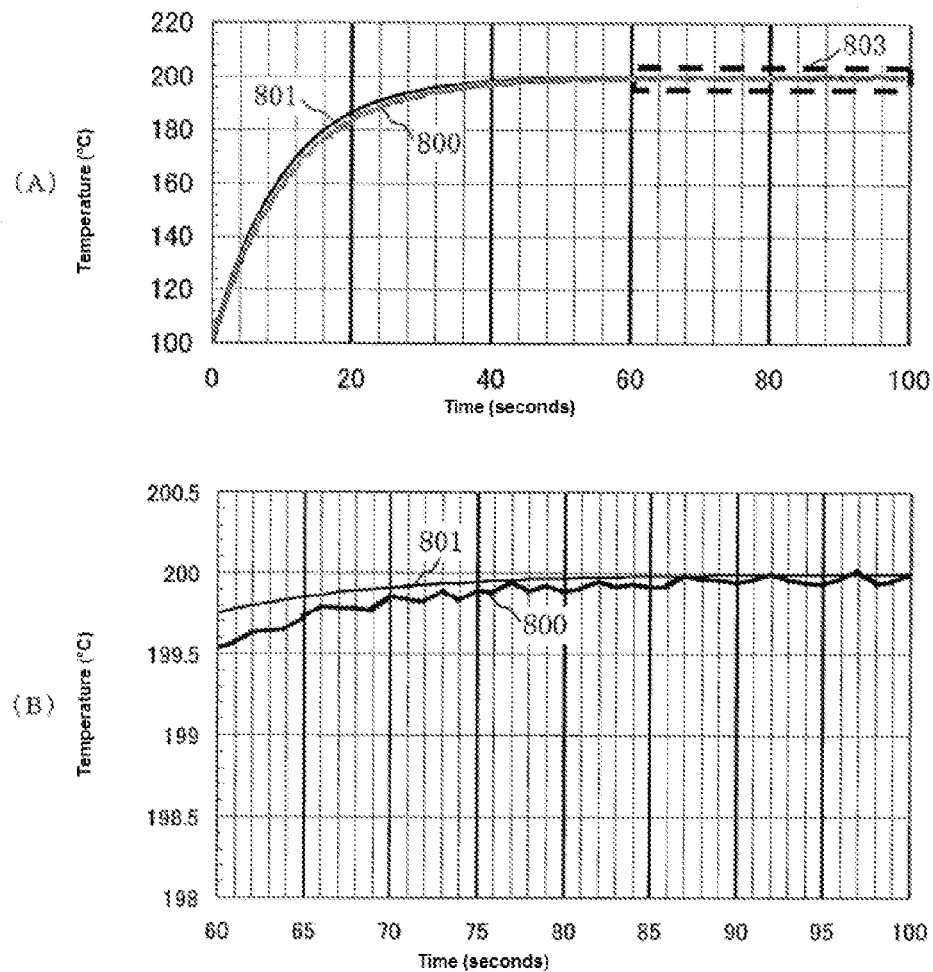
FIG. 8 is a diagram illustrating an example display of the target quantity data and a model-response waveform.

FIG. 8 (A) and FIG. 8 (B) are diagrams for explaining the purpose of the present example, diagrams illustrating examples of displays of the target quantity data and the model-response waveform. FIG. 8 (A) is a diagram illustrating the modeling result screen, and FIG. 8 (B) is a diagram illustrating the modeling result screen wherein the screen in FIG. 8 (A) has been enlarged. In FIG. 8 (A) and FIG. 8 (B), 800 is the target quantity data and 801 is the model-response waveform, FIG. 8 (B) displays the region indicated by the dotted line 803 in FIG. 8 (A).

A normal control-response waveform approaches the controlled quantity setting value SP as time elapses, eventually arriving at a stabilized state, stabilized in the vicinity of the controlled quantity setting value SP. Changes in the controlled value are not uniform, but gradually get smaller as time elapses after the commencement of control. That is, the closer to the stabilized state, the finer the recognition of the misalignment between the control-response waveform that is the target and the model-response waveform, where, in contrast, the understanding of the misalignment in time becomes relatively rougher. In a range wherein this type of control approaches a stabilized state, ordinarily the understanding of the misalignment of the controlled quantity becomes more important than that of the misalignment in time, as is clear from FIG. 8 (B). The present example reduces the likelihood of attempts at excessive accuracy in the direction of the time axis through correcting the time axis tolerance interval based on the time that has elapsed.

Note that the present example envisions the use, as the tolerance interval, of the recognition tolerance interval explained above. That is, if the recognition tolerance interval explained in the example is used as the tolerance interval, then the recognition tolerance interval of the controlled quantity axis is the controlled quantity axis tolerance interval stored in the controlled quantity axis tolerance interval storing portion 30, and the recognition tolerance interval of the time axis is the pre-correction time axis tolerance interval that is stored in the pre-correction time axis tolerance interval storing portion 31.

Additionally, if the response reference tolerance interval explained in the other example is used as the tolerance interval, then the response reference tolerance interval of the controlled quantity axis will be the controlled quantity tolerance interval that is stored in the controlled quantity axis tolerance interval storing portion 30, and the response reference tolerance interval for the time axis is the pre-correction time axis tolerance interval that is stored in the pre-correction time axis tolerance interval storing portion 31. Note that when the response reference tolerance interval is used as the tolerance interval, the response reference tolerance interval calculation processing portion 20, explained above, is, of course, required.

Figure 9:
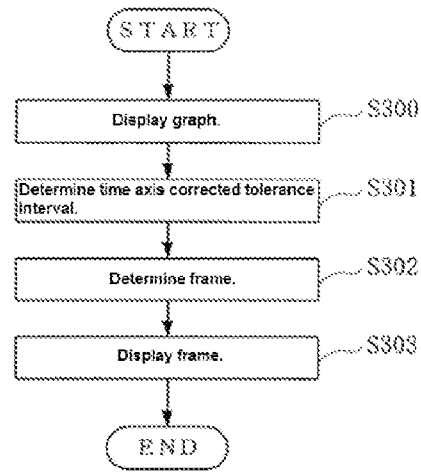
FIG. 9 is a flowchart illustrating the operation of the PID adjustment support device according to the further example according to the present invention.

The operation of the PID adjustment support device according to the present example is explained next. FIG. 9 is a flowchart illustrating the operation of the PID adjustment support device according to the present example.

A display processing portion 35 of the PID adjustment support device displays the target quantity data and the model-response waveform on the displaying portion 36 in the same manner as in the example above (Step S300 in FIG. 9).

Following this, the time axis corrected tolerance interval processing portion 34 uses the pre-correction time axis tolerance interval, stored in the pre-correction time axis tolerance interval storing portion 31, the maximum value and minimum value of the time axis tolerance interval, stored in the time axis tolerance interval upper/lower limit storing portion 32, and the correction interval for the time axis, stored in the correction interval storing portion 33, to determine the time axis corrected tolerance interval wherein the time axis tolerance interval is corrected in accordance with the display position (Step S301).

In the present form, the correction interval for the time axis is defined by the correction interval start time and the correction interval end time. In this case, if at a point earlier than a correction start time mark, the time axis tolerance interval is set to the minimum value of the time axis tolerance interval, where if the correction end time mark is exceeded, then is set to the maximum value of the time axis tolerance interval, and when within the correction interval, assumes a time axis corrected tolerance interval that is in accordance with the elapsed time on the time axis from the commencement of control to the display position of the tolerance interval.

The correction interval and the maximum value and minimum value of the time axis tolerance interval are established as below, for example. The correction start time mark Tc_START is a time mark wherein the target quantity data or controlled quantity of the model-response waveform goes beyond 62.3% of the final value. The correction end time mark Tc_END is the time mark wherein the target quantity data or controlled quantity of the model-response waveform has arrived at (SP-ϵ), wherein the ϵ is an allowable value for the misalignment from the controlled quantity setting value SP for performing stabilization evaluation. The minimum value TEW_min of the time axis tolerance interval is one half the value of the pre-correction time axis tolerance interval that is stored in the pre-correction time axis tolerance interval storing portion 31. The maximum value TEW_max of the time axis tolerance interval is a value that is identical to the pre-correction time axis tolerance interval.

The time axis corrected tolerance interval processing portion 34 determines through, for example, the following, a time axis corrected tolerance interval TEW_c (pv, t) for the coordinates (pv, t) (where pv is the coordinate on the controlled quantity axis and t is the coordinate on the time axis) of the display position wherein the time axis tolerance interval is to be displayed:

$$\text{TEW\_c}(pv, t) = \text{TEW\_min (where, } t < \text{Tc\_START)} \tag{3}$$

$$\begin{aligned}\text{TEW\_c}(pv, t) &= \{(\text{TEW\_max} - \text{TEW\_min})/(\text{Tc\_END} - \text{Tc\_START})\} \\ &\quad (t - \text{Tc\_START}) + \text{TEW\_Min} = \\ &\quad \{(\text{TEW\_max} - \text{TEW\_min})/(\text{Tc\_END} - \text{Tc\_START})\} \times t + \\ &\quad \{(\text{TEW\_min} \times \text{Tc\_END} - \text{TEW\_max} \times \text{Tc\_START})/ \\ &\quad \qquad (\text{Tc\_END} - \text{Tc\_START})\} \\ &(\text{where, Tc\_START} \le t \le \text{Tc\_END})\end{aligned} \tag{4}$$

$$\text{TEW\_c}(pv, t) = \text{TEW\_max (where, Tc\_END} < t) \tag{5}$$

The display processing portion 35 uses the coordinate of a specific display position as the center, and establishes a rectangular frame of the sizes of the time axis corrected tolerance interval determined by the time axis corrected tolerance interval processing portion 34 and the controlled quantity axis tolerance interval which is stored in the controlled quantity axis tolerance interval storing portion 30 (Step S302), and displays the frame on the displaying portion 36 (Step S303). As with the above example, the coordinates (pv, t) of the display position of the modeling result initial screen may be defined as specific values, and thereafter the frame may be displayed centered on coordinates (pv, t) of display positions that are specified by the user through, for example, mouse clicks. Moreover, the processes in FIG. 9 are also performed when the user enlarges or reduces the modeling result screen through operating the operating portion 37.

Figure 10:
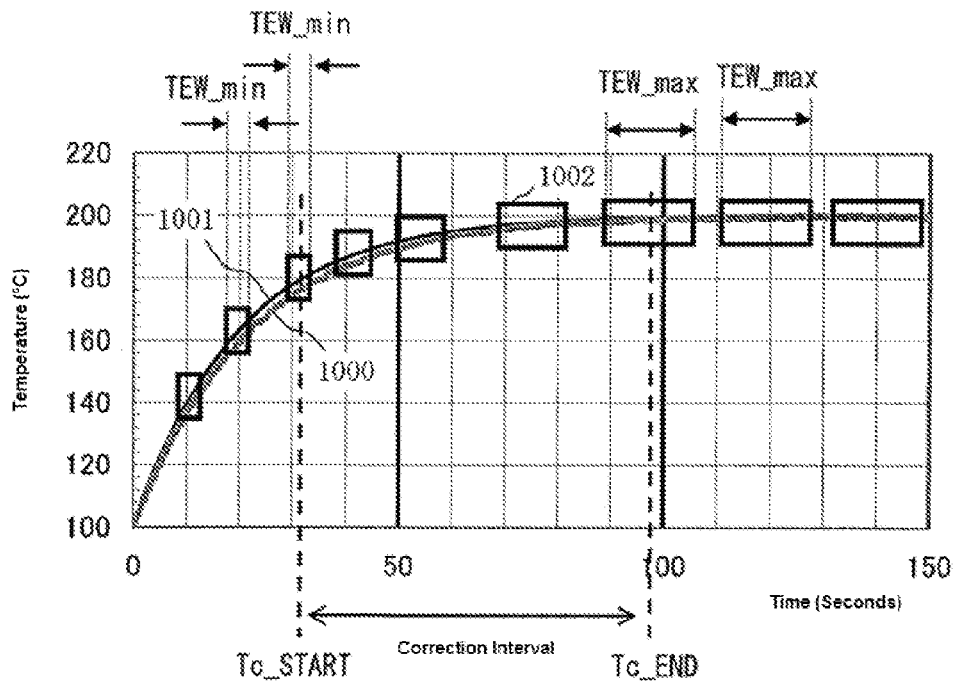
FIG. 10 is a diagram illustrating an example display of the PID adjustment support device according to the further example according to the present invention.

FIG. 10 is a diagram illustrating an example of a display in the present example. In FIG. 10, 1000 is the target quantity data, 1001 is the model-response waveform, and 1002 is the frame. In the example in FIG. 10 it can be seen that the size of the frame in the direction of the time axis, that is, the time axis corrected tolerance interval, changes depending on the display position within the correction interval.

As described above, the present example, through correcting the time axis tolerance interval, enables a reduction in the likelihood that the user will excessively pursue accuracy of matching of the target quantity data and the model-response waveform.

Note that preferably a lower limit value is set for the corrected tolerance interval in the stabilized state (the time axis tolerance interval maximum value in the present form of embodiment). The lower limit value may be set as appropriate in advance, and, for example, may be set based on the anticipated hunting period and amplitude.

Figure 11:
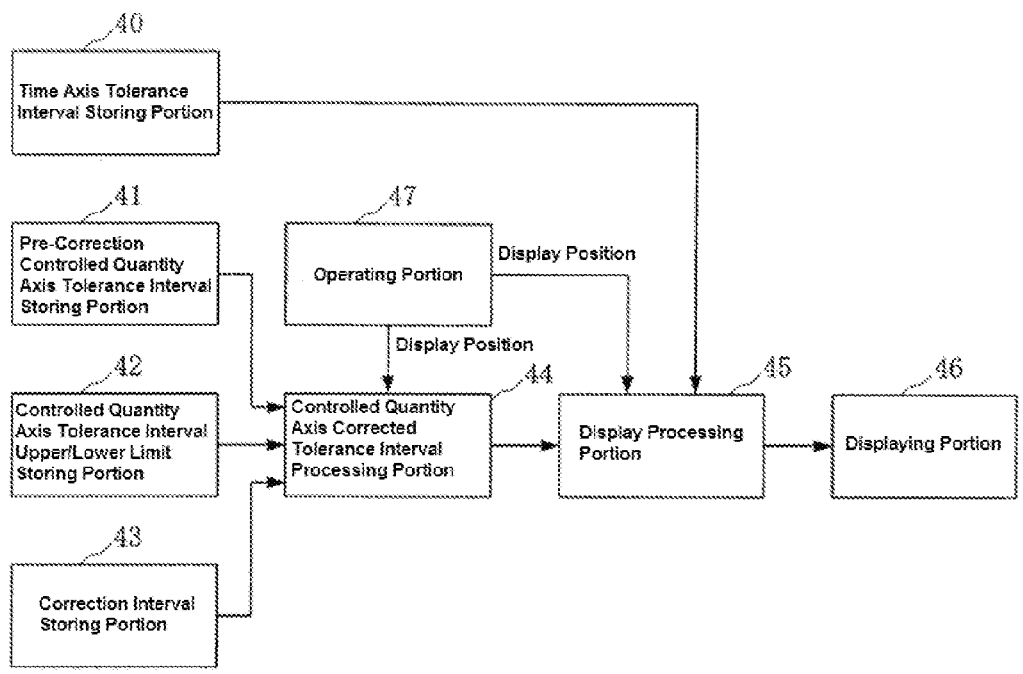
FIG. 11 is a block diagram illustrating a configuration of a PID adjustment support device according to yet another example according to the present invention.

FIG. 11 is a block diagram illustrating a configuration of a PID adjustment support device according to another example according to the present invention. The PID adjustment support device includes: a time axis tolerance interval storing portion 40 for storing a tolerance interval for a time axis; a pre-correction controlled quantity axis tolerance interval storing portion 41 for storing a controlled quantity axis tolerance interval prior to a correction; a controlled quantity axis tolerance interval upper/lower limit storing portion 42 for storing a maximum value and a minimum value for the controlled quantity axis tolerance interval; a correction interval storing portion 43 for storing a correction interval for performing a correction on the controlled quantity axis tolerance interval; a controlled quantity axis corrected tolerance interval processing portion 44 for determining a controlled quantity axis corrected tolerance interval wherein the controlled quantity axis tolerance interval is corrected based on the pre-correction controlled quantity axis tolerance interval, the maximum value and minimum value for the controlled quantity axis tolerance interval, the correction interval for the tolerance interval, and the display position; a display processing portion 45 for displaying target quantity data and a model-response waveform on a displaying portion 46, described below, and for determining a display position and a shape for a frame based on the tolerance intervals and on a display position specified by a user; a displaying portion 46 such as a liquid crystal display; and an operating portion 47, such as a keyboard and/or a mouse.

Corrections were performed on the tolerance interval for the time axis above, in the present example corrections are performed on the tolerance interval for the controlled quantity axis. That is, in the present example, a correction is applied to the tolerance interval (the recognition tolerance interval or the response reference tolerance interval) of the controlled quantity axis. The likelihood of attempts at excessive accuracy can be reduced by correcting the controlled quantity axis tolerance interval by reflecting the trends in changes in the tolerance interval of the controlled quantity axis depending on the state of control. While in the present example, the controlled quantity deviation at the display position is used in calculating the corrected value, a variable that reflects the state of control, such as elapsed time, may also be used in calculating the corrected value.

Figure 12:
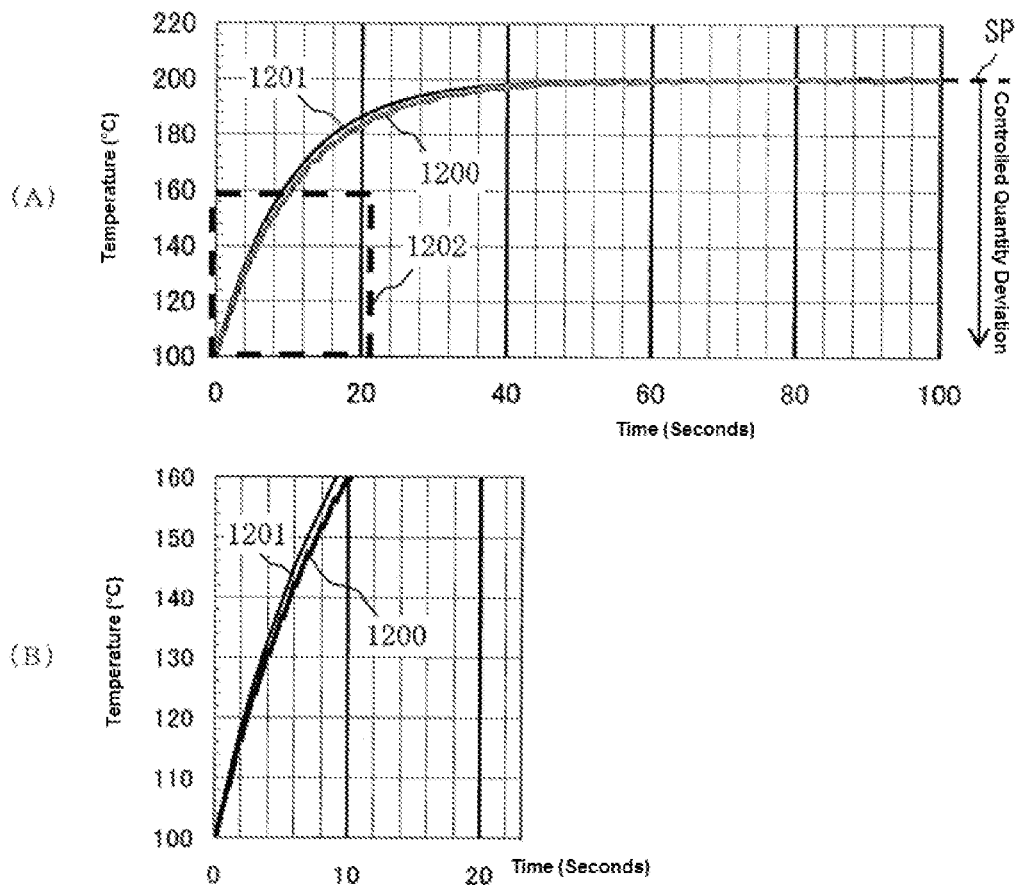
FIG. 12 is a diagram illustrating an example display of the target quantity data and a model-response waveform.

FIG. 12 (A) and FIG. 12 (B) are diagrams for explaining the purpose of the present form of example, diagrams illustrating examples of displays of the target quantity data and the model-response waveform. FIG. 12 (A) is a diagram illustrating the modeling result screen, and FIG. 12 (B) is a diagram illustrating the modeling result screen wherein the screen in FIG. 12 (A) has been enlarged. In FIG. 12 (A) and FIG. 12 (B): 1200 is target quantity data and 1201 is a model-response waveform. FIG. 12 (B) displays the region indicated by the dotted line 1202 in FIG. 12 (A).

The change in the controlled quantity is large near the start of the control operation, and gradually becomes smaller as time elapses. That is, the nearer to the starting point of the control operation, the rougher the recognition of the misalignment between the targeted control-response waveform and the controlled quantity of the model-response waveform, where, in contrast, the recognition of the misalignment in time is relatively acute. In this way, in an area that is near to the starting point of the control operation, as can be understood from FIG. 12 (B), normally the recognition of the misalignment of the time that is the timing with which there is a change in the controlled quantity is more important than the misalignment of the controlled quantity. In the present form of embodiment, the likelihood that there can be an excessive pursuit of accuracy in the direction of the controlled quantity is reduced through correcting the controlled quantity tolerance interval based on the controlled quantity deviation.

Note that the present example envisions the use, as the tolerance interval, of the recognition tolerance interval explained in above. That is, if the recognition tolerance interval explained in the above example is the time axis tolerance interval stored in the time axis tolerance interval storing portion 40, and the recognition tolerance interval of the controlled quantity axis will be the pre-correction controlled quantity axis tolerance interval that is stored in the pre-correction controlled quantity axis tolerance interval storing portion 41.

Additionally, if the response reference tolerance interval explained in the other example used as the tolerance interval, then the response reference tolerance interval of the time axis is time axis tolerance interval stored in the time axis tolerance interval storing portion 40, and the response reference tolerance interval of the controlled quantity axis is the pre-correction controlled quantity axis tolerance interval that is stored in the pre-correction controlled quantity axis tolerance interval storing portion 41. Note that when the response reference tolerance interval is used as the tolerance interval, the response reference tolerance interval calculation processing portion 20, explained above, is, of course, required.

Figure 13:
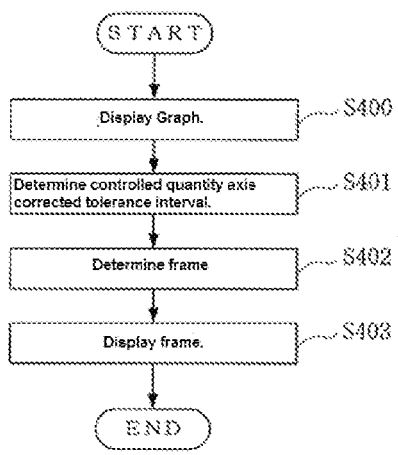
FIG. 13 is a flowchart illustrating the operation of the PID adjustment support device according to the example according to the present invention.

The operation of the PID adjustment support device according to the present example is explained next. FIG. 13 is a flowchart illustrating the operation of a MD adjustment support device. As with the above example, the display processing portion 45 of the PID adjustment support device displays the target quantity data and the model-response waveform on the displaying portion 46 (Step S400 in FIG. 13).

Following this, the controlled quantity axis corrected tolerance interval processing portion 44 uses the pre-correction controlled quantity axis tolerance interval, stored in the pre-correction controlled quantity axis tolerance interval storing portion 41, the maximum value and minimum value of the controlled quantity axis tolerance interval, stored in the controlled quantity axis tolerance interval upper/lower limit storing portion 42, and the correction interval for the controlled quantity axis, stored in the correction interval storing portion 43, to determine the controlled quantity axis corrected tolerance interval wherein the controlled quantity axis tolerance interval is corrected in accordance with the controlled quantity deviation at the display position (Step S401).

In the present example, the correction interval for the controlled quantity axis is the correction interval starting controlled quantity deviation and the correction interval editing controlled quantity deviation. In this case, the controlled quantity axis tolerance interval is set to the minimum value of the controlled quantity axis tolerance interval when the controlled quantity deviation is smaller than the deviation quantity at the end of the correction, where if the controlled quantity deviation is larger than deviation quantity at the beginning of the correction, then it is set to the maximum value of the controlled quantity axis tolerance interval, and when within the correction interval, assumes a controlled quantity axis corrected tolerance interval that is corrected in accordance with the controlled quantity deviation at the display location of the tolerance interval.

The correction interval and the maximum value and minimum value of the controlled quantity axis tolerance interval are established as below, for example. The correction start deviation quantity PVc_START_$\delta$ has the controlled quantity step width (that is, |controlled quantity setting value SP–controlled quantity starting value|) be 90%. The correction end deviation quantity PVc_END_$\delta$ has the controlled quantity step width be 10%. The minimum value PVEW_min of the controlled quantity axis tolerance interval is the same as the pre-correction controlled quantity axis tolerance interval that is stored in the pre-correction controlled quantity axis tolerance interval storing portion 41. The maximum value PVEW_max of the controlled quantity axis tolerance interval is a value that is twice the pre-correction controlled quantity axis tolerance interval.

The controlled quantity axis corrected tolerance interval processing portion 44 determines through, for example, the following, a controlled quantity axis corrected tolerance interval PVEW_c (pv, t) for the coordinates (pv, t) (where pv is the coordinate on the controlled quantity axis and t is the coordinate on the time axis) of the display position wherein the controlled quantity axis tolerance interval is to be displayed:

$$PVEW\_c(pv, t) = PVEW\_max \quad (6)$$
(where $\delta(pv, t) > PVc\_START\_\delta$)

$$PVEW\_c(pv, t) = \quad (7)$$
$\{(PVEW\_min - PVEW\_max)/(PVc\_END\_\delta - PVc\_START\_\delta)\}$
$(\delta(pv, t) - PVc\_START\_\delta) + PVEW\_max =$
$\{(PVEW\_min - PVEW\_max)/$
$(PVc\_END\_\delta - PVc\_START\_\delta)\} \times \delta(pv, t) +$
$\{(PVEW\_max \times PVc\_END\_\delta - PVEW\_min \times PVc\_START\_\delta)/$
$(PVc\_END\_\delta - PVc\_START\_\delta)\}$
(where, $PVc\_START\_\delta \leq \delta(pv, t) \leq PVc\_END\_\delta$)

$$PVEW\_c(pv, t) = PVEW\_min \quad (8)$$
(where, $PVc\_END\_\delta > \delta(pv, t)$)

in Equation (6) through Equation (8), $\delta$(pv, t) is the controlled quantity deviation at the coordinates (pv, t) of the display position, which is |SP–PV|. SP is the controlled quantity setting value, and PV is the controlled quantity at the coordinates (pv, t). Note that the target quantity data may be used as the controlled quantity PV for calculating the controlled quantity deviation, or the model-response waveform data may be used instead.

The display processing portion 45 uses the coordinate of a specific display position as the center, and establishes a rectangular frame of the sizes of the time axis tolerance interval determined by the time axis tolerance interval processing portion 40 and the controlled quantity corrected tolerance interval which is processed by the controlled quantity corrected tolerance interval processing portion 44 (Step S402), and displays the frame on the displaying portion 46 (Step S403). As with the first form of embodiment, the coordinates (pv, t) of the display position of the modeling result initial screen may be defined as specific values, and thereafter the frame may be displayed centered on coordinates (pv, t) of display positions that are specified by the user through, for example, mouse clicks. Moreover, the processes in FIG. 13 are also performed when the user enlarges or reduces the modeling result screen through operating the operating portion 47.

Figure 14:
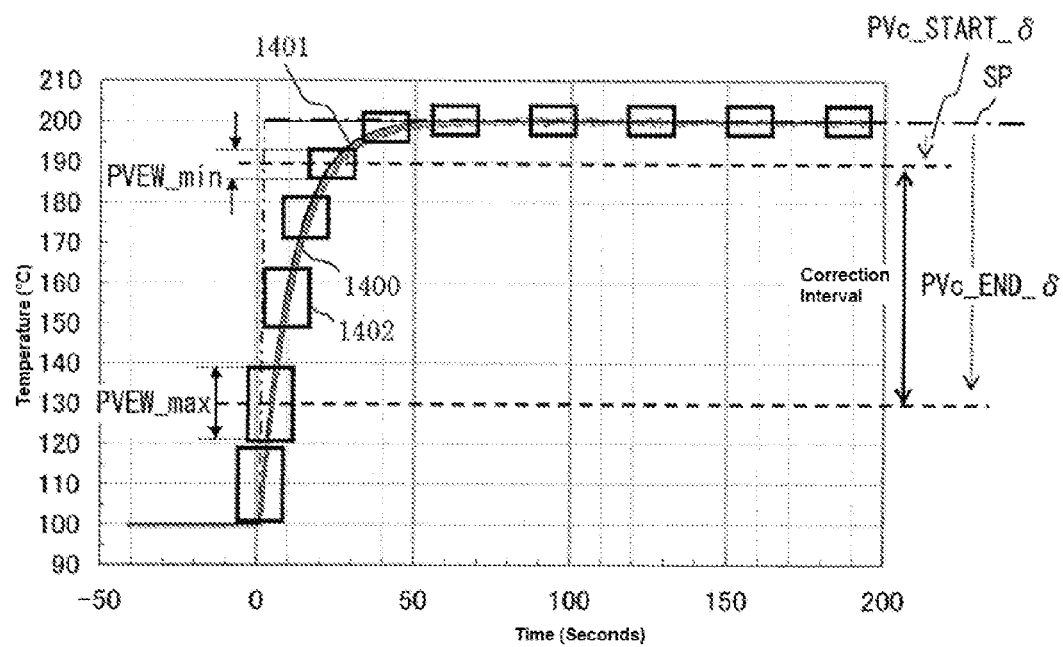
FIG. 14 is a diagram illustrating an example display of the PID adjustment support device according to the example according to the present invention.
Figure 15:
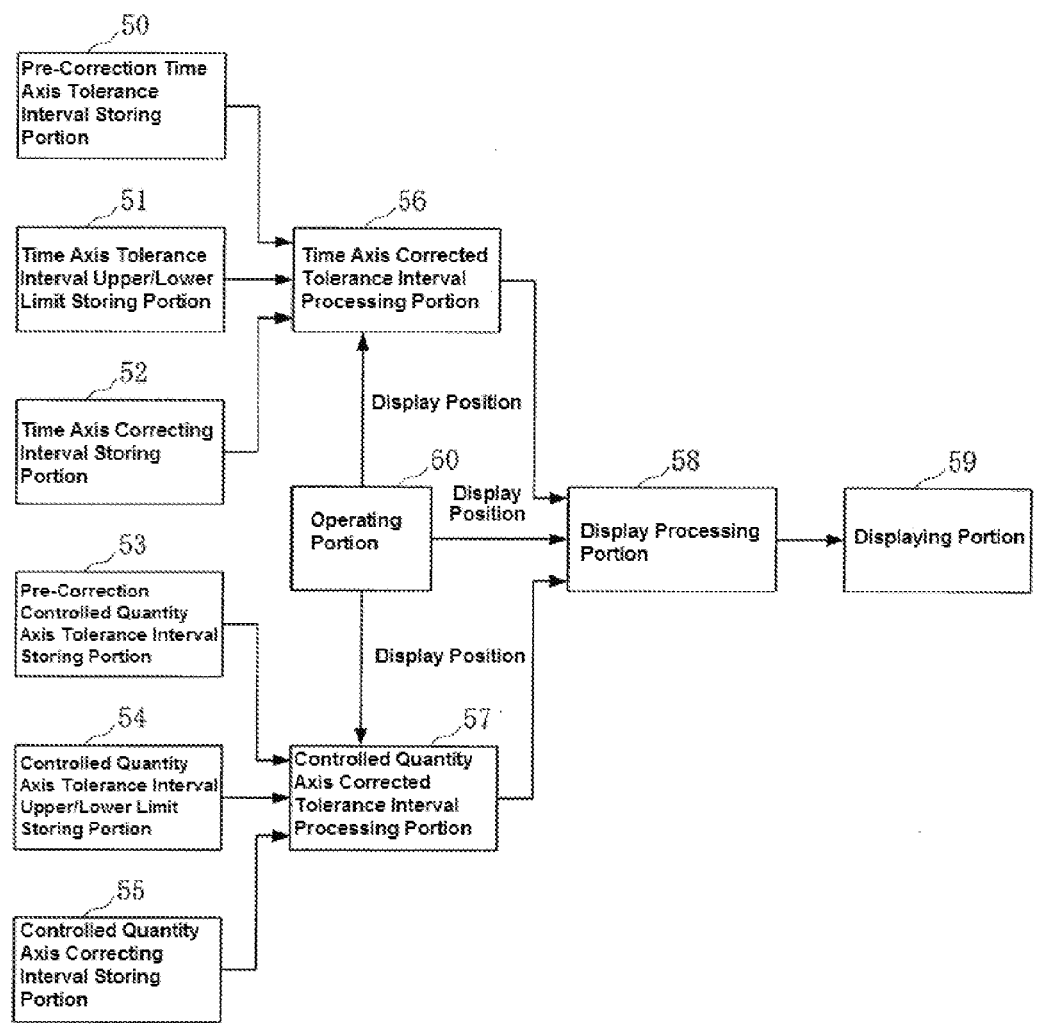
FIG. 15 is a block diagram illustrating a configuration of a PID adjustment support device according to an example according to the present invention.

FIG. 14 is a diagram illustrating an example of display according to the present example. In FIG. 14: 1400 is target quantity data, 1401 is a model-response waveform, and 1402 is a frame. In the example in FIG. 14, it can be seen that the size of the frame 1402 in the controlled quantity axis direction, that is, the controlled quantity axis corrected tolerance interval, changes in accordance with the display position within the correction interval (or more precisely, in accordance with the controlled quantity deviation at the display position).

As described above, the present example, through correcting the controlled quantity axis tolerance interval, enables a reduction in the likelihood that the user will excessively pursue accuracy of matching of the target quantity data and the model-response waveform. Note that preferably a lower limit value is set for the corrected tolerance interval in the stabilized state (the controlled quantity axis tolerance interval minimum value in the present example). The lower limit value may be set as appropriate in advance, and, for example, may be set based on the anticipated hunting period and amplitude.

The PID adjustment support device has a pre-correction time axis tolerance interval storing portion 50 for storing a time axis tolerance interval (prior to a correction; a time axis tolerance interval upper/lower limit storing portion 51 for storing a maximum value and a minimum value for the time axis tolerance interval; a time axis correction interval storing portion 52 for storing a correction interval for performing a correction on the time axis tolerance interval; a pre-correction controlled quantity axis tolerance interval storing portion 53 for storing a controlled quantity axis tolerance interval prior to a correction; a controlled quantity axis tolerance interval upper/lower limit storing portion 54 for storing a maximum value and a minimum value for the controlled quantity axis tolerance interval; a controlled quantity correcting interval storing portion 55 for storing a correction interval for performing a correction on the controlled quantity axis tolerance interval; a time axis corrected tolerance interval processing portion 56 for determining a time axis corrected tolerance interval wherein the time axis tolerance interval is corrected based on the pre-correction time axis tolerance interval, the maximum value and minimum value for the time axis tolerance interval, the correction interval for the tolerance interval, and the display position; a controlled quantity axis corrected tolerance interval processing portion 57 for determining a controlled quantity axis corrected tolerance interval wherein the controlled quantity axis tolerance interval is corrected based on the pre-correction controlled quantity axis tolerance interval, the maximum value and minimum value for the controlled quantity axis tolerance interval, the correction interval for the tolerance interval, and the display position; a display processing portion 58 for displaying target quantity data and a model-response waveform on a displaying portion 59, described below, and for determining, and displaying on the displaying portion 59, a display position and a shape for a frame based on the tolerance intervals and on a display position specified by a user; a displaying portion 59 such as a liquid crystal display; and an operating portion 60, such as a keyboard and/or a mouse.

The present example is a combination of the two above examples, where a correction to the time axis tolerance interval and a correction to the controlled quantity axis tolerance interval are performed simultaneously.

Figure 16:
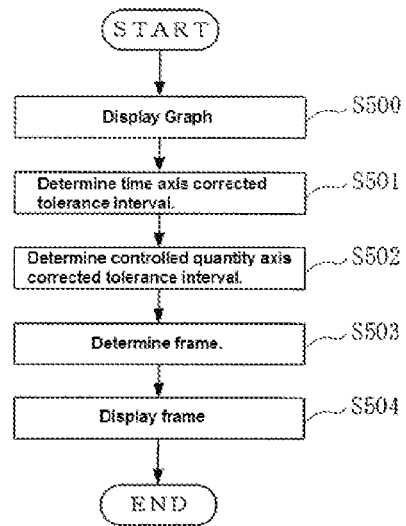
FIG. 16 is a flowchart illustrating the operation of the PID adjustment support device according to the example according to the present invention.

FIG. 16 is a flowchart illustrating the operation of a HD adjustment support device according to the present example. The display processing portion 58 of the PID adjustment support device displays the target quantity data and the model-response waveform on the displaying portion 59 (Step S500 in FIG. 16).

Following this, the time axis corrected tolerance interval processing portion 56, in the same manner as the time axis corrected tolerance interval processing portion 34 in the above example, uses the pre-correction time axis tolerance interval, stored in the pre-correction time axis tolerance interval storing portion 50, the maximum value and minimum value of the time axis tolerance interval, stored in the time axis tolerance interval upper/lower limit storing portion 51, and the correction interval for the time axis, stored in the time axis correction interval storing portion 52, to determine the time axis corrected tolerance interval wherein the time axis tolerance interval is corrected in accordance with the display position (Step S501).

As with the controlled quantity axis corrected tolerance interval processing portion 44 above, the controlled quantity axis corrected tolerance interval processing portion 57 uses the pre-correction controlled quantity axis tolerance interval, stored in the pre-correction controlled quantity axis tolerance interval storing portion 53, the maximum value and minimum value of the controlled quantity axis tolerance interval, stored in the controlled quantity axis tolerance interval upper/lower limit storing portion 54, and the correction interval for the controlled quantity axis, stored in the controlled quantity axis correcting interval storing portion 55, to determine the controlled quantity axis corrected tolerance interval wherein the controlled quantity axis tolerance interval is corrected in accordance with the controlled quantity deviation at the display position (Step S501).

The display processing portion 58 uses the coordinate of a specific display position as the center, and establishes a rectangular frame of the sizes of the time axis corrected tolerance interval determined by the time axis corrected tolerance interval processing portion 56 and the controlled quantity axis corrected tolerance interval which is stored in the controlled quantity axis corrected tolerance interval storing portion 57 (Step S503), and displays the frame on the displaying portion 59 (Step S504). As with the above example, the coordinates (pv, t) of the display position of the modeling result initial screen may be defined as specific values, and thereafter the frame may be displayed centered on coordinates (pv, t) of display positions that are specified by the user through, for example, mouse clicks. Moreover, the processes in FIG. 16 are also performed when the user enlarges or reduces the modeling result screen through operating the operating portion 60.

Figure 17:
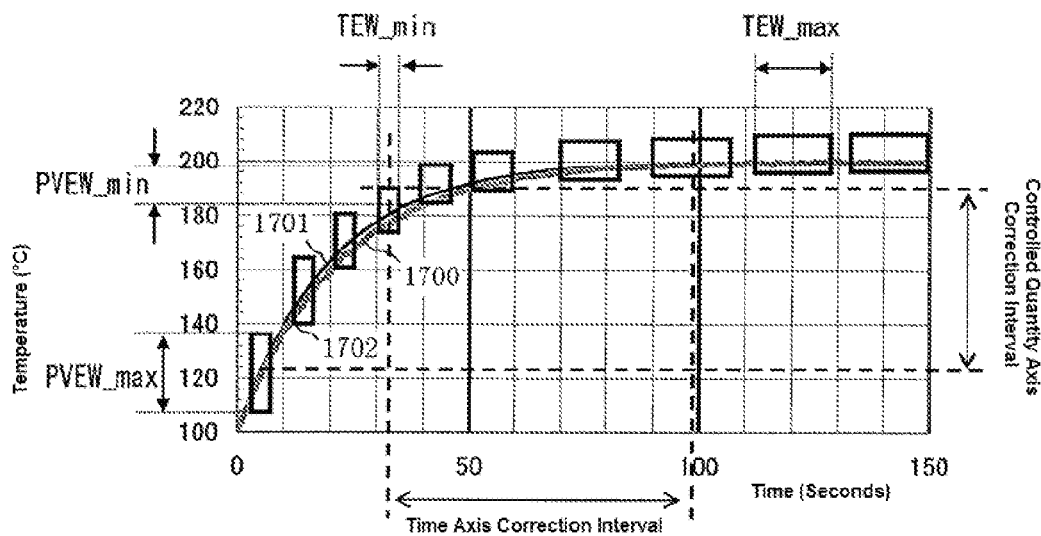
FIG. 17 is a diagram illustrating an example display of the PID adjustment support device according to the example according to the present invention.

FIG. 17 is a diagram illustrating an example of display. In FIG. 17: 1700 is target quantity data, 1701 is a model-response waveform, and 1702 is a frame. In the example in FIG. 17, it can be seen that when in the time axis corrected interval, the size of the frame 1702 in the direction of the time axis, or in other words, the time axis corrected tolerance interval, changes in accordance with the display position, and the size of the frame 1702 in the direction of the controlled quantity axis, that is, the controlled quantity axis corrected tolerance interval, changes in accordance with the display position within the controlled quantity axis corrected interval.

As described above, the present example, through correcting the time axis tolerance interval and the controlled quantity axis tolerance interval, enables a reduction in the likelihood that the user excessively pursues accuracy of matching of the target quantity data and the model-response waveform. Note that preferably lower limit values are set for the corrected tolerance intervals for each axis in the stabilized state (the time axis tolerance interval maximum value and the controlled quantity axis tolerance interval minimum value in the present form of embodiment). The lower limit value may be set as appropriate in advance, and, for example, may be set based on the anticipated hunting period and amplitude.

The PID adjustment support devices in the examples above can be embodied through a computer that is provided with, for example, a CPU, a memory, and an interface, and through a program that controls these hardware resources. The CPU executes the processes explained above in accordance with a program that is stored in a memory.

The present invention can be applied to a PID adjustment support technology that generates models to be controlled and that performs adjustments of control parameters.

The invention claimed is:

1. A Proportional Integral Derivative adjustment support device comprising:
   a tolerance interval storing device storing in advance a tolerance interval recognized by a user in regards to target quantity data of a model to be controlled;
   a modeling result display displaying the target quantity data and, as a modeling result, a model-response waveform that is a control-response waveform that is calculated based on the model to be controlled;
   a tolerance interval display overlaying and displaying the tolerance interval stored in the tolerance interval storing device and the modeling result; and
   a time axis corrected tolerance interval processor correcting, in accordance with a display position of the tolerance interval, the tolerance interval for a time axis that is displayed overlaying the modeling result, wherein
   the time axis corrected tolerance interval processor corrects the tolerance interval for the time axis in accordance with elapsed time on the time axis from a start of control in the target quantity data and the model-response waveform, until the display position of the tolerance interval for the time axis.

2. The Proportional Integral Derivative adjustment support device as set forth in claim 1, wherein:
   the tolerance interval includes a tolerance interval for a time axis and/or a tolerance interval for a controlled quantity axis.

3. The Proportional Integral Derivative adjustment support device as set forth in claim 1, further comprising:
   a controlled quantity axis corrected tolerance interval processor correcting, in accordance with a display position of the tolerance interval, the tolerance interval for the controlled quantity axis that is displayed overlaying the modeling result.

4. The Proportional Integral Derivative adjustment support device as set forth in claim 3, wherein:
the controlled quantity axis corrected tolerance interval processor corrects the tolerance interval for the controlled quantity axis in accordance with the deviation of the controlled quantity from the target quantity data or the deviation of the controlled quantity from the model-response waveform, at the display position of the tolerance interval for the controlled quantity axis.

5. The Proportional Integral Derivative adjustment support device as set forth in claim 1, wherein:
the tolerance interval display maintains and redisplays the immediately preceding tolerance interval at the time of redrawing accompanying an enlargement or reduction of the modeling result, or a change in the display position of the tolerance interval, through a user instruction.

6. A Proportional Integral Derivative adjustment support device comprising:
a modeling result display displaying target quantity data of a model to be controlled and, as a modeling result, a model-response waveform that is a control-response waveform that is calculated based on the model to be controlled;
a tolerance interval calculation processor determining a tolerance interval for the target quantity data from a full scale of the target quantity data or a full scale of the model-response waveform;
a tolerance interval display overlaying and displaying the tolerance interval, determined by the tolerance interval calculation processor, and the modeling result; and
a time axis corrected tolerance interval processor correcting, in accordance with a display position of the tolerance interval, the tolerance interval for a time axis that is displayed overlaying the modeling result, wherein
the time axis corrected tolerance interval processor corrects the tolerance interval for the time axis in accordance with elapsed time on the time axis from a start of control in the target quantity data and the model-response waveform, until the display position of the tolerance interval for the time axis.

7. A Proportional Integral Derivative adjustment support method comprising:
a modeling result displaying step for displaying target quantity data of a model to be controlled and, as a modeling result, a model-response waveform that is a control-response waveform that is calculated based on the model to be controlled;
a tolerance interval displaying step for obtaining, from a tolerance interval storing device, a tolerance interval understood by a user in relation to the target quantity data and for overlaying and displaying the tolerance interval;
a time axis corrected tolerance interval processing step for correcting, in accordance with a display position of the tolerance interval, the tolerance interval for the time axis that is displayed overlaying the modeling result, wherein,
in the time axis corrected tolerance interval processing step, the tolerance interval for the time axis is corrected in accordance with the elapsed time on the time axis from the start of control in the target quantity data and the model-response waveform, until the display position of the tolerance interval for the time axis.

8. The Proportional Integral Derivative adjustment support method as set forth in claim 7, wherein:
the tolerance interval includes a tolerance interval for a time axis and/or a tolerance interval for a controlled quantity axis.

9. The Proportional Integral Derivative adjustment support method as set forth in claim 7, further comprising:
a controlled quantity axis corrected tolerance interval processing step for correcting, in accordance with a display position of the tolerance interval, the tolerance interval for the controlled quantity axis that is displayed overlaying the modeling result.

10. The Proportional Integral Derivative adjustment support method as set forth in claim 9, wherein:
the controlled quantity axis corrected tolerance interval processing step corrects the tolerance interval for the controlled quantity axis in accordance with the deviation of the controlled quantity from the target quantity data or the deviation of the controlled quantity from the model-response waveform, at the display position of the tolerance interval for the controlled quantity axis.

11. The Proportional Integral Derivative adjustment support method as set forth in claim 7, further comprising:
the tolerance interval displaying step maintaining and redisplaying the immediately preceding tolerance interval at the time of redrawing accompanying an enlargement or reduction of the modeling result, or a change in the display position of the tolerance interval, through a user instruction.

12. A Proportional Integral Derivative adjustment support method comprising:
a modeling result displaying step for displaying target quantity data of a model to be controlled and, as a modeling result, a model-response waveform that is a control-response waveform that is calculated based on the model to be controlled; and
a tolerance interval calculation processing step for determining a tolerance interval for the target quantity data from a full scale of the target quantity data or a full scale of the model-response waveform;
a tolerance interval displaying step for overlaying and displaying the tolerance interval, determined in the tolerance interval calculation processing step, and the modeling result; and
a time axis corrected tolerance interval processing step for correcting, in accordance with a display position of the tolerance interval, the tolerance interval for the time axis that is displayed overlaying the modeling result, wherein,
in the time axis corrected tolerance interval processing step, the tolerance interval for the time axis is corrected in accordance with the elapsed time on the time axis from the start of control in the target quantity data and the model-response waveform, until the display position of the tolerance interval for the time axis.

* * * * *